April 12, 1927.

A. H. MANWARING 1,624,841

HYDRAULIC CLUTCH

Filed Aug. 3, 1925

Inventor:—
Albert H. Manwaring,
by his Attorneys:—
Howson & Howson.

Patented Apr. 12, 1927.

1,624,841

UNITED STATES PATENT OFFICE.

ALBERT H. MANWARING, OF NOBLE, PENNSYLVANIA.

HYDRAULIC CLUTCH.

Application filed August 3, 1925. Serial No. 47,881.

The present invention relates to a hydraulic clutch of the type covered by my Patent No. 1,485,987 dated March 4, 1924. The principal object of the present invention is to provide a hydraulic clutch of this general type which is simpler in construction and more efficient in operation. This object I attain by means of improved mechanism which will be described in detail. Further objects of the invention will be apparent from the following specifications and claims.

In the drawings, I have shown the embodiment of the invention which I now deem preferable, but it will be understood that the drawings are for illustrative purposes only, and that various changes and substitutions may be made within the scope of the claims without departing from the spirit of the invention.

Figure 1:
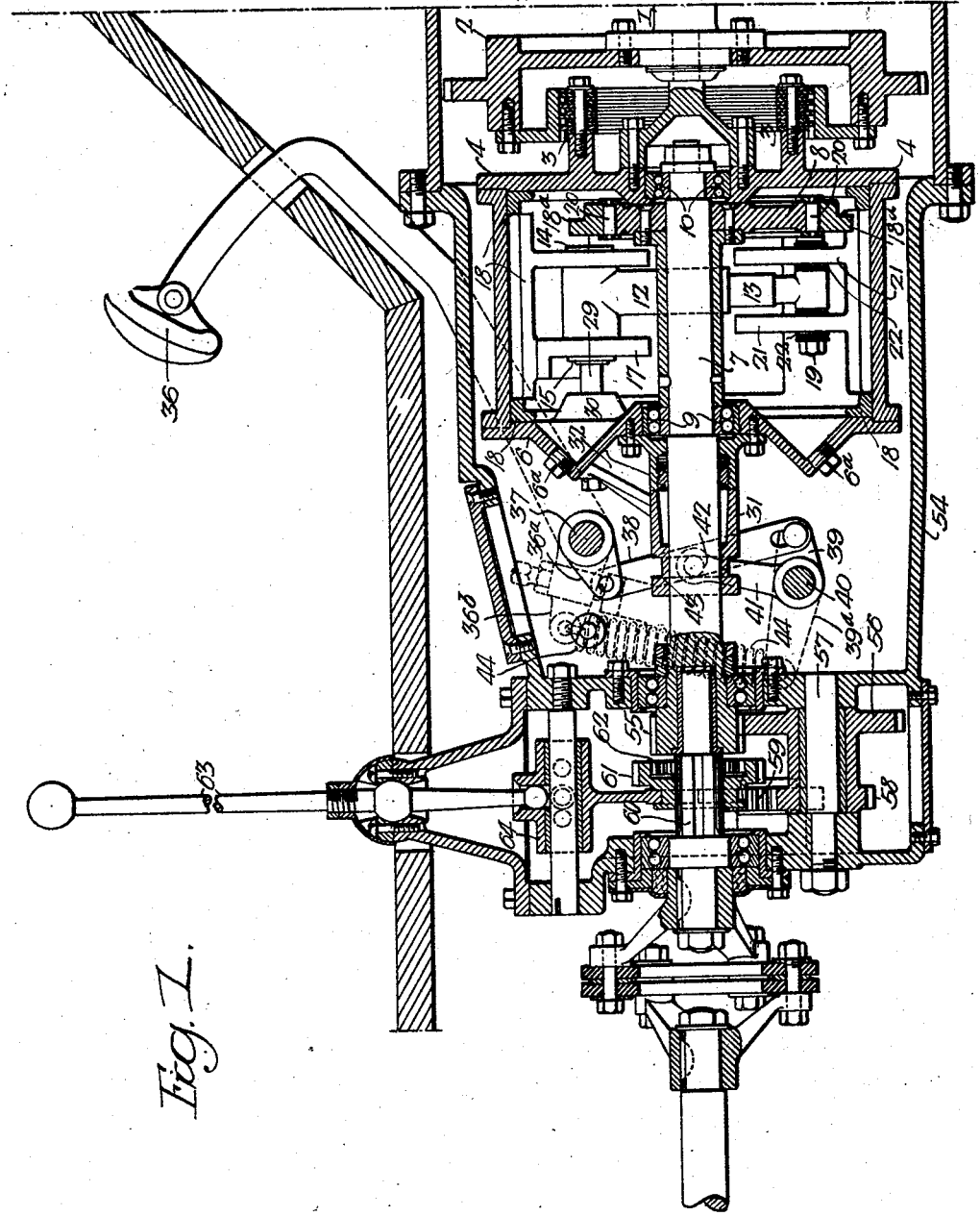
Fig. 1, is a longitudinal sectional view showing a clutch and associated parts embodying the invention.

Referring to the drawings, it will be understood that I provide driving and driven members which are rotatable about a common axis. The driving member, as shown, comprises several parts, such as the shaft 1 adapted to be connected with a motor or other source of power, a fly wheel 2, a detachable coupling 3, a flange 4 connected with the coupling, a shell 5 and a head 6. The three members 4, 5 and 6 taken together constitute a casing adapted to contain oil or other liquid for a purpose to be described. The head 6 is provided with filling openings normally closed by plugs 6ª, 6ª as shown.

The driven member comprises a shaft 7 which extends into the casing. On one of the members, that is on the driving member or on the driven member I provide an eccentric 8. As shown this eccentric is on the driven shaft 7 preferably being located near the flange 4 of the casing. As most clearly shown in Fig. 1, I preferably provide ball bearings 9 and 10 interposed between the parts of the driving and the driven members as shown.

For operatively connecting the driving member with the driven member, I provide at least one, and preferably two or more, plunger mechanisms or pumps. In the drawings, I have shown two such plunger mechanisms oppositely disposed, but it will be understood that the number can be varied as required. The two plunger mechanisms, and also the parts immediately associated therewith, are identical in construction and, therefore, a description of one will suffice for both.

Figure 2:
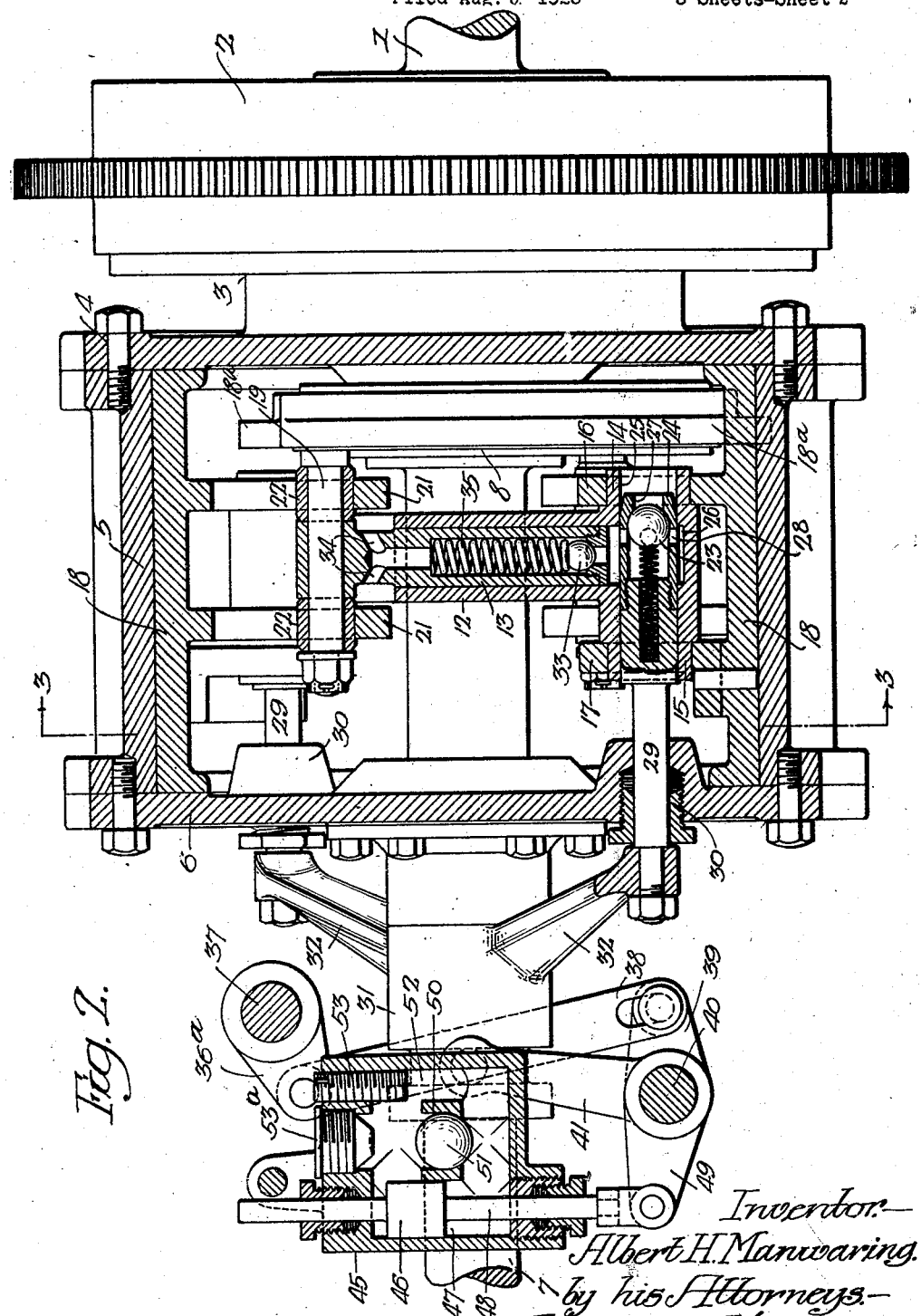
Fig. 2, is an enlarged longitudinal sectional view taken along the line 2—2 of Fig. 3.
Figure 3:
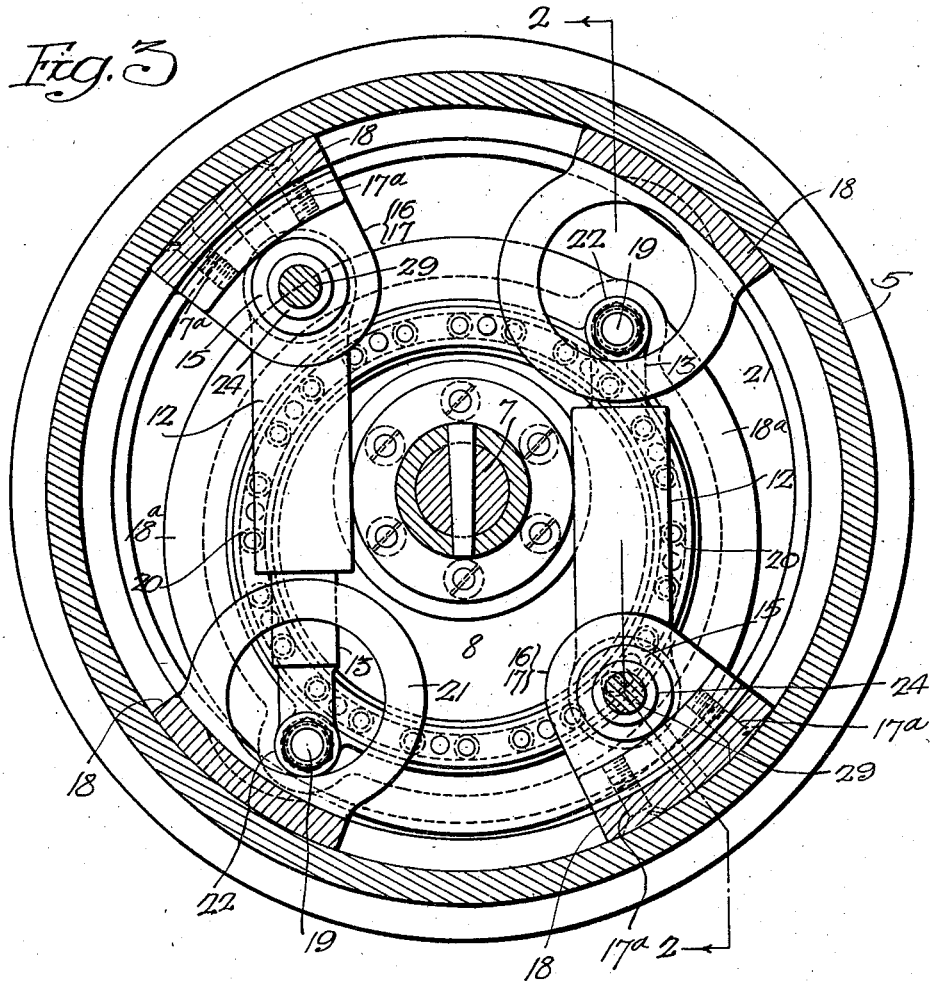
Fig. 3, is an enlarged transverse sectional view taken along the line 3—3 of Fig. 2.

As shown more clearly in Figs. 2 and 3, each plunger mechanism comprises a cylinder 12 and a piston 13 slidable therein. Either the cylinder or the piston is pivotally connected to the driving member for movement about an eccentric longitudinal pivotal axis, and I prefer and have shown the cylinder so connected. As illustrated the cylinder 12 is provided with trunnions 14 and 15 which are seated in bearing apertures in lugs 16 and 17 projecting inward from a detachable spider 18 mounted in the surface of the casing member 5. In order to facilitate assembly the lug 17 is removable, being held in place by screws 17ª.

The other member of the plunger mechanism, in this case the piston 13, is operatively connected with the driven member. For this purpose, I prefer and have shown an eccentric ring 18ª surrounding the aforementioned eccentric 8 and carrying a longitudinal pivot pin 19. The piston 13 is extended and provided with an aperture through which the pin 19 extends. Preferably in order to reduce friction to a minimum a roller bearing 20 is interposed between the eccentric 8 and the eccentric ring 18ª.

From the foregoing description, it will be apparent that, when the driving member is rotated independently of the driven member, the eccentric ring 18ª will be made to rotate on the eccentric, thus causing the axis of the pin 19 to follow a path with respect to the rotating driving member which is circular and which has a diameter equal to the throw of the eccentric. This relative circular movement of the pin 19 causes the piston 13 to reciprocate in the cylinder 12.

In order to support and guide the pin 19 in its relative movement with respect to the casing I provide at least one guide, and preferably two such guides, adapted to continuously support the pin throughout its entire path of movement. As the path of relative movement is circular, the guides are circular being in the form of cylindrical apertures formed in lugs 21, 21 projecting inward from the spider 18. Preferably in order to reduce friction to a minimum rollers 22, 22 are mounted on the pin 19 at opposite sides of the piston and the internal diameter of the guides 21 is made such that they are continuously in engagement with the rollers.

In order to enable the plunger mechanism to transmit power from one member to the other, a suitable amount of oil or other liquid is placed in the casing and a suitable valve mechanism is provided for controlling the flow of the liquid from the casing into the cylinder or from the cylinder back into the casing. This valve is in the form of an automatic ball check valve 23 which is so arranged that it permits the oil or other liquid to enter the cylinder, but prevents, or at least retards, the discharge of oil from the cylinder. It will be apparent that with the check valve in operation the relative movement of the piston and cylinder would cause the cylinder to be filled with oil. However, the check valve would prevent or retard the discharge of the oil, and would thus cause the driven member to be rotated by the driving member.

The check valve 23 is preferably constructed to entirely prevent the outward flow of liquid, and in order that there may be an adjustable amount of outward flow I provide a second manually operatable valve 24. This valve 24 is preferably cylindrical in form, and is mounted in a longitudinal aperture 25 extending through the trunnions 14 and 15 and communicating with the interior of the cylinder 12. The aperture 25 is provided with an annular recess 26 and the end of the valve 24 is tapered as shown. The result is that with the valve in the position shown in Fig. 2 the flow of liquid is entirely cut off. By moving the valve toward the left the tapered portion thereof comes opposite the edge of the recess 26 and a space for the passage of oil is provided, the cross-sectional area of this space varying with the longitudinal adjustment of the valve. The check valve 23, already referred to, is most conveniently located in an aperture 27 in the valve 24, ports 28 being provided which communicate with the recess 26.

Each valve 24 is provided with a stem 29 which extends through the head 6, a stuffing box 30 being provided to prevent the leakage of oil. An operating collar 31 is slidably mounted on the shaft 7, and this is provided with arms 32, 32 to which the respective valve stems 29, 29 are connected.

It will be seen that the transmission of power from the driving member to the driven member can be controlled by moving the collar 31 and thus moving the valves 24, 24. With the parts in the position shown the pistons will be immediately filled with oil as already described and the check valves 23 will prevent their being emptied. Thus the two members are connected together practically directly and will rotate at or about the same speed. However, if the valves 24 be moved slightly to the left a slow discharge of oil will be permitted from the cylinders and the driven member will rotate at a slightly less speed than the driving member. By reference to Fig. 3, it will be seen that two plunger mechanisms are oppositely arranged so that one of them is being filled while the other is being emptied. Thus a practically continuous torque is obtained. By moving the valves further toward the left the speed of the driven member can be further reduced until the valves reach their extreme left-hand positions where the driven member stops, the pistons simply working back and forth freely in the cylinders.

As a safety device to prevent damage to the mechanism through the application of a load too suddenly, or through the application of too great a load, I provide an auxiliary relief valve which will relieve excess pressure in the cylinders. Preferably I provide for this purpose a ball check valve 33 which is located in the piston, and arranged to discharge through ports 34 at the outer end thereof. This valve is provided with a spring 35 which is sufficiently powerful to hold the valve closed except under emergency conditions.

Any usual or preferred means may be used for moving the collar 31, but when the clutch is to be used on an automobile, I prefer to provide a foot-pedal 36 which is pivoted on a transverse shaft 37. A link 38 is pivoted to an arm 36ª on the shaft 37 and is also connected with an arm 39 secured to a transverse shaft 40. Connected with the arm 39 is a forked yoke 41 having pins 42 which enter an annular groove 43 formed in the collar 31. It will be seen that when the pedal 36 is depressed the yoke 41 and the collar 31 will be moved toward the left, thus moving the valves 24 toward the left to slow down or stop the rotation of the driven member.

Preferably I provide means to prevent the sudden movement of the valves 24 to closed position as this would cause the load to be picked up suddenly and would subject the entire mechanism to undue strains. To this end I provide a lost-motion connection between the lower end of the link 38 and the arm 39. Thus the operator, by means of the pedal, can move the arm 39 and the yoke 41 in the counter-clockwise direction, but is unable to move them in the clockwise direction. For moving these parts in the clockwise direction, I provide a spring 44, preferably connected between an arm 39ª on the shaft 40 and an extension 36ᵇ of the pedal 36. This spring not only serves to move the collar 31 toward the right but also serves to normally hold the pedal in its upper position. It will be obvious that the spring 44 can move the collar 31 only to the extent permitted by the position of the pedal 36, and that the operator by moving the pedal to an intermediate position can permit the spring to move the valves 24 to an intermediate position.

In order to prevent the spring 44 from moving the valves too rapidly, I provide a dash-pot mechanism 45, shown in Fig. 2. This mechanism comprises a piston 46 which is movable in a cylinder 47. A piston rod 48 is connected with an arm 49 on the shaft 40. A by-pass 50 is provided between the two ends of the piston 47, this by-pass containing a ball check valve which permits the piston 46 to move freely in the downward direction when the valves 24 are being opened, but it retards the movement of the piston 46 in the upward direction when the valves 24 are being closed. In order that movement in the upward direction may take place at a suitable speed a second by-pass 52 is provided, which has an adjusting screw 53 permitting a limited amount of leakage past the valve 51. A plug 53ª is provided to permit the introduction of oil into the dash-pot mechanism.

I have shown my improved hydraulic clutch as forming a part of an automobile drive mechanism. The clutch proper is enclosed in a casing 54, and at the rear end of the casing is a suitable reversing gearing. As illustrated the rear end of the shaft 7 carries a gear 55 which meshes with a gear 56 rotatable on a longitudinal bearing pin 57. Connected with the gear 56 is a pinion 58 which meshes with an idler gear 59. A shaft 60 is mounted in line with the shaft 7, and a gear 61 is splined on this shaft. The gear 61 is adapted to mesh with the idler gear 59, and it is also provided with internal gear teeth 62 adapted to fit into and engage the teeth of the gear 55. In the drawing the gear 61 is shown in its intermediate or neutral position. An operating handle 63 and a sliding yoke 64 are provided for moving the gear 61 either into engagement with the gear 55 or into mesh with the gear 59. It will be clear that in the former position the drive is direct, and that in the latter position the drive is reversed.

What I claim is:

1. In a hydraulic clutch, the combination of driving and driven members rotatable about a common axis, a plunger mechanism comprising a cylinder having a bore of definite diameter and a piston therein, said plunger mechanism having an eccentric longitudinal pivotal connection at one end with one of the members, an eccentric connected with the other members, an eccentric ring surrounding the eccentric, a longitudinal pivot pin directly carried by the eccentric ring and engaging the other end of the plunger mechanism, a port in said cylinder having an area substantially equal to that of the cylinder bore and a valve capable of fully opening or closing said port controlling the flow of liquid into and out of the cylinder of the plunger mechanism.

2. In a hydraulic clutch, the combination of driving and driven members rotatable about a common axis, a plurality of opposed plunger mechanisms each comprising a cylinder having a bore of definite diameter and a piston therein said plunger mechanism having an eccentric longitudinal pivotal connection at one end with one of the members, an eccentric connected with the other member, an eccentric ring surrounding the eccentric, a plurality of longitudinal pivot pins directly carried by the eccentric ring and respectively engaging the other ends of the plunger mechanisms, a port in each cylinder having an area substantially equal to that of the cylinder bore and valves having areas substantially equal to those of said ports for controlling the flow of liquid into and out of the cylinders of the plunger mechanisms.

3. In a hydraulic clutch, the combination of driving and driven members rotatable about a common axis, a plunger mechanism comprising a cylinder and piston and having an eccentric longitudinal pivotal connection at one end with one of the members, an eccentric connected with the other member, an eccentric ring surrounding the eccentric, a longitudinal pivot pin directly carried by the eccentric ring and engaging the other end of the plunger mechanism, a circular guide on the first said member and encircling said pin for continuously supporting the said pin during relative movement between the two members, and a valve controlling the flow of liquid into and out of the cylinder of the plunger mechanism.

4. In a hydraulic clutch, the combination of driving and driven members rotatable about a common axis, a plurality of plunger mechanisms each comprising a cylinder and piston and having an eccentric longitudinal pivotal connection at one end with one of the members, an eccentric connected with the other member, an eccentric ring surrounding the eccentric, a plurality of longitudinal pivot pins directly carried by the eccentric ring and respectively engaging the other ends of the plunger mechanisms, circular guides on the first said member, each guide encircling one of said pins for continuously supporting the said pins during relative movement between the two members, and valves controlling the flow of liquid into and out of the cylinders of the plunger mechanisms.

5. In a hydraulic clutch, the combination of driving and driven members rotatable about a common axis, a plunger mechanism comprising a cylinder and piston and having an eccentric longitudinal pivotal connection at one end with one of the members, an eccentric connected with the other member, an eccentric ring surrounding the eccentric, a longitudinal pivot pin directly carried by the eccentric ring and engaging the other end of the plunger mechanism, a roller on the pin, a circular guide on the first said member and encircling said roller being continuously in engagement with the roller for supporting the pin during relative movement between the two members, and a valve controlling the flow of liquid into and out of the cylinder of the plunger mechanism.

6. In a hydraulic clutch, the combination of driving and driven members rotatable about a common axis, a plunger mechanism comprising a cylinder and piston and having an eccentric longitudinal pivotal connection at one end with one of the members, an eccentric connected with the other member, an eccentric ring surrounding the eccentric, a longitudinal pivot pin directly carried by the eccentric ring and engaging the other end of the plunger mechanism, two rollers on the pin at opposite sides of the plunger mechanism, two circular guides on the first said member continuously in engagement with the respective rollers for supporting the pin during relative movement between the two members, and a valve controlling the flow of liquid into and out of the cylinder of the plunger mechanism.

7. In a hydraulic clutch, the combination of driving and driven members rotatable about a common axis, a plunger mechanism comprising a cylinder and piston and having an eccentric longitudinal pivotal connection at one end with one of the members, means operatively connected with the other member and having an eccentric longitudinal pivotal connection with the other end of the plunger mechanism, a casing enclosing the said plunger mechanism and adapted to contain a liquid, a longitudinally movable manually adjustable cylindrical valve for controlling the flow of liquid from the casing into the cylinder of the plunger mechanism and from the cylinder into the casing, and an automatic check valve located inside of the cylindrical valve.

8. In a hydraulic clutch, the combination of driving and driven members rotatable about a common axis, a plunger mechanism comprising a cylinder and piston and having an eccentric longitudinal pivotal connection at one end with one of the members, means operatively connected with the other member and having an eccentric longitudinal pivotal connection with the other end of the plunger mechanism, a casing enclosing the said plunger mechanism and adapted to contain a liquid, a longitudinally movable manually adjustable cylindrical valve for controlling the flow of liquid from the casing into the cylinder of the plunger mechanism and from the cylinder into the casing, an automatic check valve located inside of the cylindrical valve for also controlling the said flow, and means operable while the members are rotating for adjusting the first said valve.

9. In a hydraulic clutch, the combination of driving and driven members rotatable about a common axis, a plunger mechanism comprising a cylinder and piston and having an eccentric longitudinal pivotal connection at one end with one of the members, means operatively connected with the other member and having an eccentric longitudinal pivotal connection with the other end of the plunger mechanism, a casing enclosing the said plunger mechanism and adapted to contain a liquid, an automatic check valve for controlling the flow of liquid from the casing into the cylinder of the plunger mechanism and from the cylinder into the casing, and a second manually adjustable valve for also controlling the said flow, means manually operable while the members are rotating for opening the last said valve, and spring means releasable by the manually operable means and operable independently for closing the last said valve.

10. In a hydraulic clutch, the combination of driving and driven members rotatable about a common axis, a plunger mechanism comprising a cylinder and piston and having an eccentric longitudinal pivotal connection at one end with one of the members, means operatively connected with the other member and having an eccentric longitudinal pivotal connection with the other end of the plunger mechanism, a casing enclosing the said plunger mechanism and adapted to contain a liquid, an automatic check valve for controlling the flow of liquid from the casing into the cylinder of the plunger mechanism and from the cylinder into the casing, a second manually adjustable valve for also controlling the said flow, means manually operable while the members are rotating for opening the last said valve, spring means releasable by the manually operable means and operable independently for closing the last said valve, and a dash-pot for regulating the action of the spring.

11. In a hydraulic clutch, the combination of driving and driven members rotatable about a common axis, a plunger mechanism comprising a cylinder and piston and having an eccentric longitudinal pivotal connection at one end with one of the members, means operatively connected with the other member and having an eccentric longitudinal pivotal connection with the other end of the plunger mechanism, a casing enclosing the said plunger mechanism and adapted to contain a liquid, an automatic check valve for controlling the flow of liquid from the casing into the cylinder of the plunger mechanism and from the cylinder into the casing, a second manually adjustable valve for also controlling the said flow, and an automatic valve carried by the piston and discharging through the outer end thereof for relieving excess pressure in the cylinder.

ALBERT H. MANWARING.